United States Patent
Won et al.

(10) Patent No.: US 9,704,062 B2
(45) Date of Patent: Jul. 11, 2017

(54) METHOD AND APPARATUS FOR WARNING AN OBSTACLE OF A VEHICLE

(71) Applicant: HYUNDAI MOTOR COMPANY, Seoul (KR)

(72) Inventors: Ji Eun Won, Hwaseong-si (KR); Gyo Young Jung, Seoul (KR); Eu Gene Chang, Gunpo-si (KR); Uk Il Yang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 299 days.

(21) Appl. No.: 14/562,217

(22) Filed: Dec. 5, 2014

(65) Prior Publication Data

US 2016/0057393 A1 Feb. 25, 2016

(30) Foreign Application Priority Data

Aug. 19, 2014 (KR) .................. 10-2014-0107907

(51) Int. Cl.
| | |
|---|---|
| *G06K 9/62* | (2006.01) |
| *B60R 1/00* | (2006.01) |
| *G06T 7/579* | (2017.01) |
| *G06T 7/215* | (2017.01) |
| *G06T 7/223* | (2017.01) |

(52) U.S. Cl.
CPC .............. *G06K 9/6202* (2013.01); *B60R 1/00* (2013.01); *G06T 7/215* (2017.01); *G06T 7/223* (2017.01);

(Continued)

(58) Field of Classification Search
CPC ...... H04N 7/18; B60R 1/00; B60R 2300/105; B60R 2300/301; B60R 2300/8093;

(Continued)

(56) References Cited

U.S. PATENT DOCUMENTS

2009/0297041 A1 12/2009 Nagamine et al.
2010/0104199 A1* 4/2010 Zhang ................ G06K 9/00798
382/199

(Continued)

FOREIGN PATENT DOCUMENTS

| JP | 2817594 B2 | 10/1998 |
|---|---|---|
| JP | 2009-296038 A | 12/2009 |

(Continued)

*Primary Examiner* — Tung Vo
(74) *Attorney, Agent, or Firm* — McDermott Will & Emery LLP

(57) ABSTRACT

An apparatus for warning an obstacle of a vehicle includes an image obtaining device configured to take an image around the vehicle through image sensors. An image segmentation device is configured to segment a current reference image obtained in blocks of an object. A motion estimator is configured to estimate two dimensional motion information of the object. A variation estimator is configured to estimate distance information between the object and the vehicle. A relative motion estimator is configured to estimate three dimensional relative motion information of the object by combining the two dimensional motion information and the distance information. A collision time estimator is configured to estimate a collision time between the object and the vehicle by using the three dimensional relative motion information. An image processor is configured to adjust a brightness of a corresponding segmented block. A display is configured to display the image.

12 Claims, 3 Drawing Sheets

(52) U.S. Cl.
CPC ........ *G06T 7/579* (2017.01); *B60R 2300/105* (2013.01); *B60R 2300/301* (2013.01); *B60R 2300/8093* (2013.01); *G06T 2207/10021* (2013.01); *G06T 2207/30261* (2013.01)

(58) Field of Classification Search
CPC ... G06T 7/2006; G06K 9/6202; G01T 7/0006; G01T 7/579; G01T 7/215; G01T 7/223; G01T 2207/10021; G01T 2207/30261
USPC .......................................................... 348/143
See application file for complete search history.

(56) References Cited

U.S. PATENT DOCUMENTS

| | | | |
|---|---|---|---|
| 2010/0191391 A1* | 7/2010 | Zeng | G01S 13/723 701/1 |
| 2010/0253489 A1* | 10/2010 | Cui | G01S 13/723 340/425.5 |
| 2013/0251193 A1* | 9/2013 | Schamp | G06K 9/00201 382/103 |
| 2014/0239891 A1* | 8/2014 | Martin | B60L 11/182 320/108 |
| 2014/0270378 A1* | 9/2014 | Aimura | G06K 9/00805 382/103 |

FOREIGN PATENT DOCUMENTS

| | | |
|---|---|---|
| JP | 2011-070580 A | 4/2011 |
| JP | 2013-101432 A | 5/2013 |
| KR | 10-2013-0007243 A | 1/2013 |
| KR | 10-2013-0094997 A | 8/2013 |
| KR | 10-2013-0118116 A | 10/2013 |

* cited by examiner

METHOD AND APPARATUS FOR WARNING AN OBSTACLE OF A VEHICLE

CROSS-REFERENCE TO RELATED APPLICATION

This application is based on and claims the benefit of priority to Korean Patent Application No. 10-2014-0107907, filed on Aug. 19, 2014 in the Korean Intellectual Property Office, the disclosure of which is incorporated herein in its entirety by reference.

TECHNICAL FIELD

The present disclosure relates to a method and apparatus for warning an obstacle, and more particularly, a method and apparatus for warning an obstacle which intuitively transmit obstacle information to a driver.

BACKGROUND

Various active safety systems have been provided in a vehicle in order to prevent accidents. Human machine interface (HMI) technology has been developed for efficiently transmitting various danger warnings to a driver. Recently, the HMI technology has been used more widely for recognizing the surrounding environment by using an image sensor.

The most common obstacle detection/warning system is an ultrasonic-based parking assist system. This parking assist system recognizes an obstacle, measures a distance from the vehicle to the obstacle by ultrasonic waves, and warns the driver as a sound if the distance between the vehicle and the obstacle is small. The driver can recognize whether the obstacle exists through the warning sound, but position information of the obstacle is not provided. In the prior art, an estimated position of the obstacle is notified through the HMI.

A rear camera based obstacle detection/warning system enables the driver to recognize the obstacle by changing a color (for example, red color) of the entire outline of an image of the obstacle when the obstacle exits in a predefined area. However, since the prior art changes the color of the border and shows only whether the obstacle exists, the driver must directly confirm the position of the obstacle.

In the related art, an around view monitoring (AVM) based obstacle detection/warning system may check whether an obstacle exists in all direction of the vehicle, but a driver must directly confirm an exact location of the obstacle.

A surveillance system is provided, which uses the HMI for superimposing a highly saturated color on a detected obstacle or displaying the obstacle in a square. This method intuitively provides a position of the detected object as well as the existence of the obstacle. However, this surveillance system may provide inaccurate information of the obstacle due to the use of highly saturated color, and when the number of the detected obstacles is large, the complexity of the HMI increases, and thus, safe driving may not be secured.

SUMMARY

An aspect of the present inventive concept provides a method and an apparatus for warning an obstacle, which intuitively transmit obstacle information to a driver by improving visibility and observability for the obstacle through a brightness adjustment of an image acquired by an image sensor.

According to an exemplary embodiment of the present inventive concept, an apparatus for warning an obstacle of a vehicle comprises an image obtaining device configured to take an image around ae vehicle through at least two image sensors. An image segmentation device is configured to segment a current reference image obtained through one image sensor among the at least two image sensors in blocks of an object. A motion estimator is configured to estimate two dimensional motion information of the object in each of segmented blocks segmented by the image segmentation device. A variation estimator is configured to estimate distance information between the object in a segmented block and the vehicle. A relative motion estimator is configured to estimate three dimensional relative motion information of the object in the segmented block by combining the two dimensional motion information and the distance information. A collision time estimator is configured to estimate a collision time between the object in the segmented block and the vehicle by using the three dimensional relative motion information. An image processor is configured to adjust a brightness of a corresponding segmented block in a pre-defined ratio according to the collision time. A display is configured to display an image processed by the image processor.

The at least two image sensors may be mounted on the vehicle in a horizontal arrangement.

The object may be an obstacle.

The motion estimator may estimate the two dimensional motion information by comparing the current reference image and a previous reference image.

The variation estimator may estimate the distance information by estimating a variation using a correlation between the current reference image and a comparison image obtained through another image sensor.

The collision time estimator may estimate the collision time between the object in the segmented block and the vehicle by using a time difference between the current reference image and the previous reference image and the three dimensional relative motion information.

The image processor may add a shadow effect to an outline of a corresponding segmented block if the collision time is less than a threshold time.

The present invention may further comprise a warning output configured to output a warning signal if the collision time is less than a threshold time.

According to another exemplary embodiment of the present inventive concept, a method for warning an obstacle of a vehicle includes taking an image around the vehicle through at least two image sensors. A current reference image inputted through one image sensor of the at least two image sensors is segmented in blocks of an object. Two dimensional motion information of the object in each of segmented blocks segmented and distance information are estimated. Three dimensional relative motion information of the object in a segmented block is estimated by combining the two dimensional motion information and the distance information. A collision time between the object in the segmented block and the vehicle is estimated by using the three dimensional relative motion information. The image is displayed by adjusting a brightness of a corresponding segmented block in a pre-defined ratio according to the collision time.

The two dimensional motion information may be estimated by comparing the current reference image and a previous reference image.

The distance information may be estimated by estimating a variation using a correlation between the current reference image and a comparison image obtained through another image sensor.

The step of estimating a collision time estimates the collision time between the object in the segmented block and the vehicle by using a time difference between the current reference image and the previous reference image and the three dimensional relative motion information.

The method further includes adding a shadow effect to an outline of a corresponding segmented block if the collision time is less than a threshold time.

The method further comprises step of outputting a warning signal if the collision time is less than a threshold time.

According to the present disclosure, obstacle information can be intuitively transmitted to the driver by improving visibility and observability for the obstacle through the brightness adjustment of the image acquired by an image sensor.

The present disclosure can provide position information of an obstacle as well as the existent of the obstacle.

In addition, the present disclosure can guide the driver's eye to the obstacle and so improve visibility and observability for the obstacle by using a high-contrast effect increasing the brightness of the obstacle in the image and using a shadow effect to the outline of the obstacle.

The present disclosure can further guide the driver's eye to the obstacle which the collision risk is large by the warning based on the collision time.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present inventive concept will be described in detail with reference to the drawings.

According to the present disclosure, information of an obstacle can be intuitively and efficiently transmitted to a driver by improving visibility and observability of an image for the obstacle by adjusting brightness of the image which is acquired by an image sensor.

Figure 1:
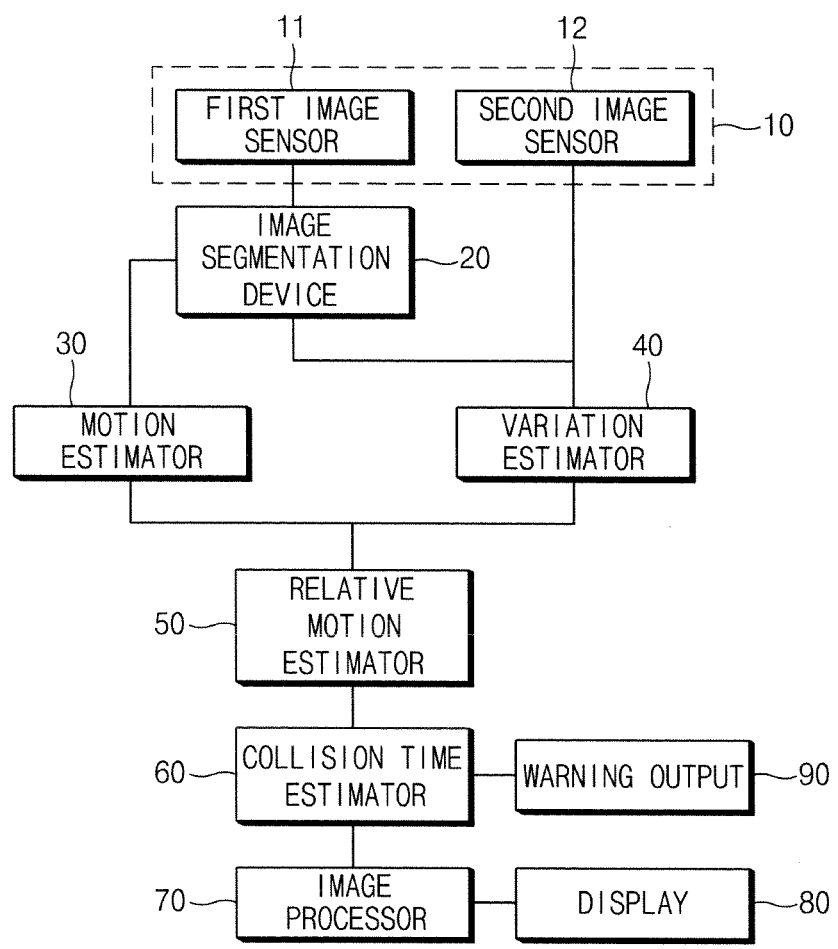
FIG. 1 is a block configuration diagram showing an apparatus for warning an obstacle of a vehicle according to an embodiment of the present inventive concept.

FIG. 1 is a block configuration diagram showing an apparatus for warning an obstacle of a vehicle according to an embodiment of the present inventive concept.

As shown in FIG. 1, the apparatus for warning an obstacle of a vehicle according to the present disclosure includes an image obtaining device 10, an image segmentation device 20, a motion estimator 30, a variation estimator 40, a relative motion estimator 50, a collision time estimator 60, an image processor 70, a display 80, and a warning output 90.

The image obtaining device 10 is mounted on a vehicle and obtains images around the vehicle. The image obtaining device 10 includes a first image sensor 11 and a second image sensor 12 horizontally arranged and mounted on the vehicle. For example, a first camera and a second camera may be horizontally mounted on a front left side and a front right side of the vehicle, respectively. In the present disclosure, the image obtaining device 10 which includes two image sensors 11, 12 is shown, but the image obtaining device 10 may have more than two image sensors.

One image among the images taken through the first image sensor 11 and the second image sensor 12 is used as a current reference image. An example which the image taken through the first image sensor 11 is used as the reference image according to an exemplary embodiment of the present inventive concept will be described.

The image segmentation device 20 segments the current reference image obtained through the image obtaining device 10 in blocks of an object based on color information and outline information. Here, the object means an obstacle.

The motion estimator 30 estimates two dimensional motion (2D motion) information for each of the segmented blocks by comparing the current reference image and a previous reference image for each of the segmented blocks. That is, the motion estimator 30 estimates the two dimensional motion information of the obstacle (object) in each of the segmented blocks.

The variation estimator 40 estimates distance information between the obstacle and its vehicle in each of the segmented blocks by estimating a variation between the current reference image and a comparison image for each of the segmented blocks. Here, the comparison image is an image which is not selected as the reference image, and is transmitted from the second image sensor 12.

The relative motion estimator 50 estimates three dimensional relative motion information for each of the segmented blocks by combining the two dimensional motion information for each of the segmented blocks and the distance information. In other words, the relative motion estimator 50 extracts the three dimensional relative motion information of the object in a segmented block.

The collision time estimator 60 estimates a collision time (time to collision (TTC)) between the object and the vehicle in each of the segmented blocks by using a time difference between the current reference image and the previous reference image and the three dimensional relative motion information. Here, the collision time is a time elapsed until the vehicle collides with the obstacle.

The image processor 70 actively adjusts brightness of each of segmented blocks to a preset ratio in accordance with the collision time. The image processor 70 adds a shadow effect to the outermost outline of each of the segmented blocks if the collision time is less than a threshold time. That is, the image processor 70 adds the shadow effect to the outline of the obstacle in the corresponding image if the collision risk with the obstacle in the image obtained through the image obtaining device 10 is detected.

The display 80 outputs the image processed through the image processor 70. The display 80 is implemented as liquid crystal display (LCD), head-up display (HUD), light emitting diode (LED) display, a transparent display, and the like.

The warning output 90 outputs a warning signal if the collision time is less than the threshold time. At this time, the warning signal may be implemented as a combination of lighting of a light emitting element, an audio signal, a voice signal, and the like.

Figure 2:
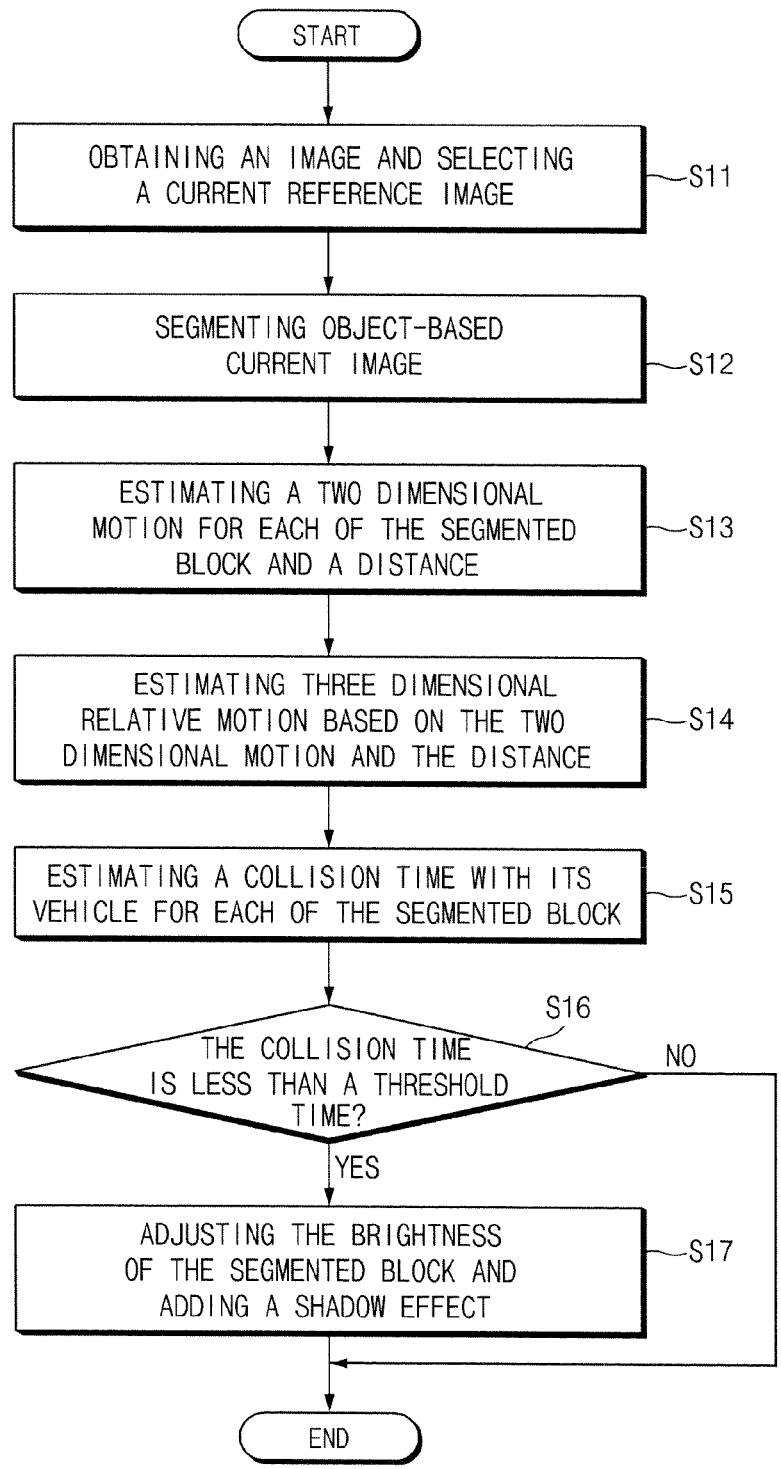
FIG. 2 is a flow chart showing a method for warning an obstacle of a vehicle according to an embodiment of the present inventive concept.
Figure 3:
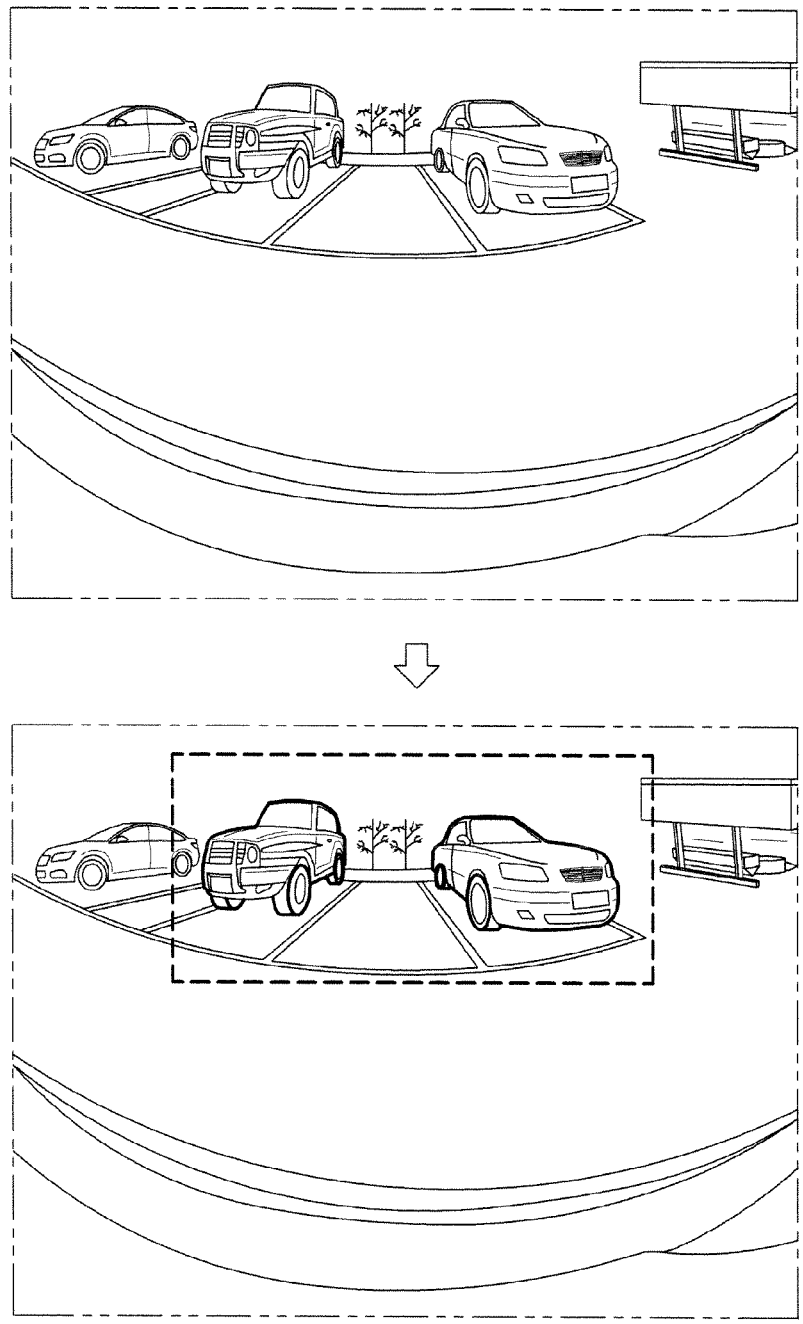
FIG. 3 is an exemplary diagram showing an obstacle information display screen according to an embodiment of the present inventive concept.

FIG. 2 is a flow chart showing a method for warning an obstacle of a vehicle according to an embodiment of the present inventive concept, and FIG. 3 is an exemplary diagram showing an obstacle information display screen according to an embodiment of the present inventive concept. The apparatus for warning an obstacle of a vehicle (hereinafter, an obstacle warning apparatus) obtains images around the vehicle through at least two image sensors, and sets one image among the obtained images as a current reference image (S11). For example, the obstacle warning apparatus selects an image inputted through the first image sensor 11 and the second image sensor 12 as a current reference image. In the present disclosure, one reference image is selected, but reference images more than two may be also selected.

The image segmentation device 20 segments the current reference image inputted through a preset image sensor in blocks of an object based on color information and outline information (S12). Here, the object may be an obstacle.

And, the obstacle warning apparatus estimates two dimensional motion information and distance information for each of the blocks segmented by the image segmentation device 20 (S13). Here, the motion estimator 30 estimates the two dimensional motion information of the object for each of the segmented blocks by comparing the current reference image and a previous reference image. The variation estimator 40 estimates a variation by using a correlation between the current reference image and the previous reference image for each of the segmented blocks, and estimates the distance information between the object and an own vehicle for each of the segmented blocks through the variation estimation. That is, the motion estimator 30 estimates the two dimensional motion information of the object and the distance information, and the variation estimator 40 estimates the distance from the vehicle to the object.

The relative motion estimator 50 estimates the three dimensional relative motion information of each of the segmented blocks by combining the two dimensional motion information for each of the segmented blocks and the distance information (S14). In other words, the relative motion estimator 50 estimates the three dimensional relative motion information of each object by combining the two dimensional motion information of each object and the distance information.

The collision time estimator 60 estimates the collision time (time to collision (TTC)) between the object in each of segmented blocks and the vehicle by using a time difference between the current reference image and the previous reference image and the three dimensional relative motion information (S15).

The image processor 70 actively adjusts brightness of each of the segmented blocks in a preset ratio according to the collision time (S16). Here, the smaller the collision time between the object (obstacle) in the image obtained through the image obtaining device 10 and the vehicle becomes, the brighter each of the segmented blocks becomes.

The image processor 70 adds a shadow effect to the outmost outline of a corresponding segmented block if the collision time is less than a threshold time (S17, S18). In other words, the image processor 70 adds the shadow effect to the outmost outline of the corresponding object as shown in FIG. 3 if the object having a collision risk is detected in the image obtained through the image obtaining device 10.

Then, the image processor 70 outputs the image-processed image to the display 80. At this time, the warning output 90 outputs the warning signal, if the collision time is less than the threshold time.

As shown in FIG. 3, since the present disclosure recognizes the obstacle in the image obtained by the image sensors and improves the visibility and observability of the obstacle by adjusting the brightness and applying the shadow effect to the corresponding obstacle, a driver can intuitively and quickly recognize the obstacle in the image.

What is claimed is:

1. An apparatus for warning an obstacle of a vehicle comprising:
    an image obtaining device configured to take an image around the vehicle through at least two image sensors;
    an image segmentation device configured to segment a current reference image obtained through one image sensor among the at least two image sensors in blocks of an object;
    a motion estimator configured to estimate two dimensional motion information of the object in each of segmented blocks segmented by the image segmentation device;
    a variation estimator configured to estimate distance information between the object in a segmented block and the vehicle;
    a relative motion estimator configured to estimate three dimensional relative motion information of the object in the segmented block by combining the two dimensional motion information and the distance information;
    a collision time estimator configured to estimate a collision time between the object in the segmented block and the vehicle by using the three dimensional relative motion information;
    an image processor configured to adjust a brightness of a corresponding segmented block in a pre-defined ratio according to the collision time; and
    a display configured to display an image processed by the image processor,
    wherein the image processor adds a shadow effect to an outline of the corresponding segmented block if the collision time is less than a threshold time.

2. The apparatus according to claim 1, wherein the at least two image sensors are mounted on the vehicle in a horizontal arrangement.

3. The apparatus according to claim 1, wherein the object is an obstacle.

4. The apparatus according to claim 1, wherein the motion estimator estimates the two dimensional motion information by comparing the current reference image and a previous reference image.

5. The apparatus according to claim 1, wherein the variation estimator estimates the distance information by estimating a variation using a correlation between the current reference image and a comparison image inputted through another image sensor.

6. The apparatus according to claim 1, wherein the collision time estimator estimates the collision time between the object in the segmented block and the vehicle by using a time difference between the current reference image and the previous reference image and the three dimensional relative motion information.

7. The apparatus according to claim 1, wherein the apparatus further comprises a warning output configured to output a warning signal if the collision time is less than the threshold time.

8. A method for warning an obstacle of a vehicle comprising steps of:
- taking an image around the vehicle through at least two image sensors;
- segmenting a current reference image obtained through one image sensor among the at least two image sensors in blocks of an object;
- estimating two dimensional motion information of the object in each of segmented blocks and distance information;
- estimating three dimensional relative motion information of the object in a segmented block by combining the two dimensional motion information and the distance information;
- estimating a collision time between the object in the segmented block and the vehicle by using the three dimensional relative motion information;
- adding a shadow effect to an outline of a corresponding segmented block if the collision time is less than a threshold time; and
- displaying the image by adjusting a brightness of the corresponding segmented block in a pre-defined ratio according to the collision time.

9. The method according to claim 8, wherein the two dimensional motion information is estimated by comparing the current reference image and a previous reference image.

10. The method according to claim 8, wherein the distance information is estimated by estimating a variation using a correlation between the current reference image and a comparison image inputted through another image sensor.

11. The method according to claim 8, wherein the step of estimating the collision time estimates the collision time between the object in the segmented block and the vehicle by using a time difference between the current reference image and a previous reference image and the three dimensional relative motion information.

12. The method according to claim 8, further comprising: a step of outputting a warning signal if the collision time is less than the threshold time.

* * * * *